(12) United States Patent
Poplavski et al.

(10) Patent No.: US 9,253,189 B1
(45) Date of Patent: Feb. 2, 2016

(54) GENERATING WEIGHTS FOR BIOMETRIC TOKENS IN PROBABILISTIC MATCHING SYSTEMS

(71) Applicant: International Business Machines Corporation, Armonk, NY (US)

(72) Inventors: Michael Poplavski, Austin, TX (US); Scott Schumacher, Porter Ranch, CA (US); Prachi Snehal, San Jose, CA (US); Sean J. Welleck, Austin, TX (US); Alan Xia, Austin, TX (US); Yinle Zhou, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/470,495

(22) Filed: Aug. 27, 2014

(51) Int. Cl.
  *G06F 21/00* (2013.01)
  *H04L 29/06* (2006.01)

(52) U.S. Cl.
  CPC ........ *H04L 63/0861* (2013.01); *H04L 63/0807* (2013.01)

(58) Field of Classification Search
  USPC .......................................................... 713/186
  See application file for complete search history.

(56) References Cited

U.S. PATENT DOCUMENTS

| | | | |
|---|---|---|---|
| 7,512,807 | B2 | 3/2009 | Hillhouse |
| 8,090,944 | B2 | 1/2012 | Lee |
| 2009/0265555 | A1* | 10/2009 | Royer .................... G06F 21/32 713/168 |
| 2011/0221567 | A1* | 9/2011 | Lehnert .............. G06K 9/00885 340/5.82 |
| 2012/0314911 | A1* | 12/2012 | Paul ........................ G06F 21/32 382/115 |
| 2013/0182913 | A1 | 7/2013 | Hoyos et al. |

OTHER PUBLICATIONS

List of IBM Patents or Patent Applications Treated as Related. Sep. 16, 2014. 2 pages.
Li, Liang, "Propensity Score Analysis with Matching Weights", Berkeley Electronic Press, Collection of Biostatics Research Archive, Working Paper 79, http://biostats.bepress.com/cobra/art79. May 2011. 18 pages.
Prasad, Saurabh, et al., "Decision Fusion With Confidence-Based Weight Assignment for Hyperspectral Target Recognition", IEEE, published in IEEE Transactions on Geoscience and Remote Sensing, 2008. vol. 46, No. 5, May 2008. pp. 1448-1456.
Struc, Vitomir, et al., "Confidence Weighted Subspace Projection Techniques for Robust Face Recognition in the Presence of Partial Occlusions", IEEE, 2010 20th International Conference on Pattern Recognition, 2010. pp. 1334-1338.

* cited by examiner

*Primary Examiner* — Andrew Nalven
*Assistant Examiner* — Khang Do
(74) *Attorney, Agent, or Firm* — Marcia L. Doubet

(57) ABSTRACT

Generating weights for biometric tokens in probabilistic matching systems is disclosed, where these weights are generated from computations performed on matched sets and unmatched sets of a reference data set. In an embodiment, scores from a similarity scoring function are distributed among bins, and a weight is computed for each bin as the log of (the matched set ratio/the unmatched set ratio), where the ratios are computed as the number of scores in a particular bin as compared to the total size of the set. The weights may then be used subsequently with scores computed by the scoring function to assess confidence of a computed similarity score, and are directed toward making the output of the probabilistic matching system more data-driven and more accurate.

12 Claims, 6 Drawing Sheets

| | | |
|---|---|---|
| 1.a -- 1.b = .9  *210* | 2.a -- 2.b = .4  *220* | 3.a -- 3.b = .9  *230* |
| 1.a -- 1.c = .9  *211* | 2.a -- 2.c = .5  *221* | 3.a -- 3.c = .9  *231* |
| 1.b -- 1.c = .9  *212* | 2.b -- 2.c = .8  *222* | 3.b -- 3.c = .9  *232* |

| | | |
|---|---|---|
| 1.a -- 2.a = .5  *310* | 3.a -- 2.a = .8 | 1.a -- 3.a = .5 |
| 1.a -- 2,b = .5 | 3.a -- 2,b = .9 | 1.a -- 3,b = .5 |
| 1.a -- 2.c = .5 | 3.a -- 2.c = .4 | 1.a -- 3.c = .5 |
| 1.b -- 2.a = .5 | 3.b -- 2.a = .4 | 1.b -- 3.a = .5 |
| 1.b -- 2.b = .5 | 3.b -- 2.b = .4 | 1.b -- 3.b = .5 |
| 1.b -- 2.c = .5 | 3.b -- 2.c = .4 | 1.b -- 3.c = .5 |
| 1.c -- 2.a = .5 | 3.c -- 2.a = .4 | 1.c -- 3.a = .5 |
| 1.c -- 2.b = .5 | 3.c -- 2.b = .4 | 1.c -- 3.b = .5 |
| 1.c -- 2.c = .5 | 3.c -- 2.c = .4 | 1.c -- 3.c = .5 |

| scoring bins | matched set count | total matched set size (Size(m)) | matched set ratio | unmatched set count | total unmatched set size (Size(n)) | unmatched set ratio | weight |
|---|---|---|---|---|---|---|---|
| [0, .45) | 1 | 9 | 0.11 | 7 | 27 | 0.26 | -0.37 |
| [.45, .7) | 1 | 9 | 0.11 | 18 | 27 | 0.67 | -0.78 |
| [.7, .85] | 1 | 9 | 0.11 | 1 | 27 | 0.04 | 0.44 |
| [.85, 1] | 6 | 9 | 0.67 | 1 | 27 | 0.04 | 1.22 |

| | scoring bins | matched set count | total matched set size (Size(m)) | matched set ratio | unmatched set count | total unmatched set size (Size(n)) | unmatched set ratio | weight |
|---|---|---|---|---|---|---|---|---|
| | | | 503 | | | 506 | | |
| 510 | [0, 0.85) | 1167 | 20639 | 0.0565 | 818367 | 11554627 | 0.0708 | -0.0978 |
| 520 | [0.85, 0.875) | 2345 | 20639 | 0.1136 | 1787732 | 11554627 | 0.1547 | -0.1341 |
| 530 | [0.875, 0.9) | 3358 | 20639 | 0.1627 | 3177705 | 11554627 | 0.2750 | -0.2280 |
| 540 | [0.9, 0.925) | 4346 | 20639 | 0.2106 | 3727302 | 11554627 | 0.3226 | -0.1852 |
| 550 | [0.925, 0.95) | 4177 | 20639 | 0.2024 | 1919755 | 11554627 | 0.1661 | 0.0857 |
| 560 | [0.95, 0.9625) | *1980 | 20639 | 0.0959 | 116879 | 11554627 | 0.0101 | 0.9779 |
| 570 | [0.9625, 0.975) | 1543 | 20639 | 0.0748 | 6848 | 11554627 | 0.0006 | 2.1009 |
| 580 | [0.975, 1] | 1723 | 20639 | 0.0835 | 39 | 11554627 | ~0.00001 | 4.3933 |

_600_

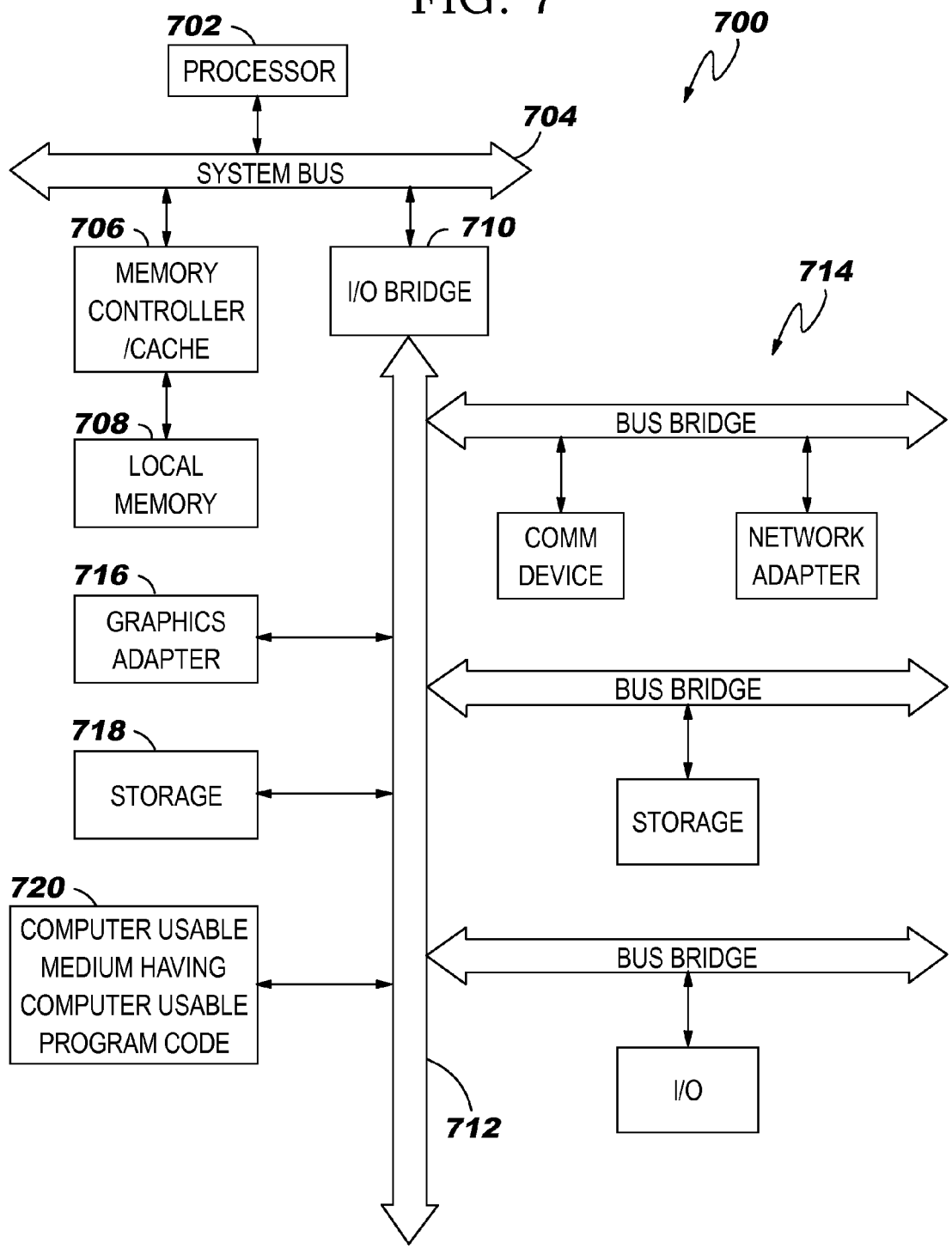

GENERATING WEIGHTS FOR BIOMETRIC TOKENS IN PROBABILISTIC MATCHING SYSTEMS

BACKGROUND OF THE INVENTION

The present invention relates to matching processes that use biometric tokens (such as facial images, fingerprints, iris scans, palm scans, and so forth), and generating weights for use in probabilistic matching systems for such biometric tokens.

Identifying a person by biographic data or demographic data (such as the person's name, address, date of birth, and so forth) has commonly been performed using a probabilistic matching system. A probabilistic matching system is one in which there are multiple possible outcomes, where each outcome may have a different degree of certainty (or uncertainty)—that is, a different probability of being true.

BRIEF SUMMARY OF THE INVENTION

The present invention is directed to generating weights for biometric tokens in probabilistic matching systems. In one embodiment, this comprises: analyzing biometric tokens of a reference data set, the reference data set comprising a plurality of biometric tokens for each of a plurality of distinct entities, the reference set further comprising a matched set of the tokens and an unmatched set of the tokens, by performing a pair-wise comparison of the tokens in the matched set and of the tokens in the unmatched set using a similarity scoring function; determining a plurality of scoring bins, based on similarity scores computed by the analyzing, wherein an upper and a lower boundary of each of the scoring bins is selected for separating the similarity scores; computing, for each of the scoring bins, a weight for the scoring bin, the weight for each bin computed in view of how many of the similarity scores from the matched set fall into the bin and how many of the similarity scores from the unmatched set fall into the bin; and using the weights for assessing subsequently-computed similarity scores from the similarity scoring function. The matched set of the tokens preferably comprises, for each of the distinct entities, a pair comprising a link between the distinct entity and each of the tokens which is known to correspond to the distinct entity. The unmatched set of the tokens preferably comprises each unique pair comprising a link between one of the distinct entities and each of the tokens which is known to not correspond to the distinct entity. The weight computed for each of the scoring bins preferably comprises a logarithm of (a ratio of the matched set for the bin divided by a ratio of the unmatched set for the bin), wherein the ratio of the matched set for the bin is computed as (a count of how many of the similarity scores from the matched set fall into the bin divided by a maximum size of the matched set) and the ratio of the unmatched set for the bin is computed as (a count of how many of the similarity scores from the unmatched set fall into the bin divided by a maximum size of the unmatched set).

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 2 provides a sample table illustrating results from a scoring function for a matched set of biometric tokens, and FIG. 3 provides a sample table illustrating results from the scoring function for an unmatched set of these same biometric tokens;

FIG. 4 provides a sample table illustrating computations that determine weights to be used with biometric tokens, in view of the scores from the matched and unmatched sets for the sample data in FIGS. 2 and 3;

FIG. 5 provides an alternative version of the sample table in FIG. 4, where this alternative version corresponds to a larger set of biometric tokens;

FIG. 7 depicts a block diagram of a data processing system in accordance with an embodiment of the present invention.

DETAILED DESCRIPTION OF THE INVENTION

Figure 1:
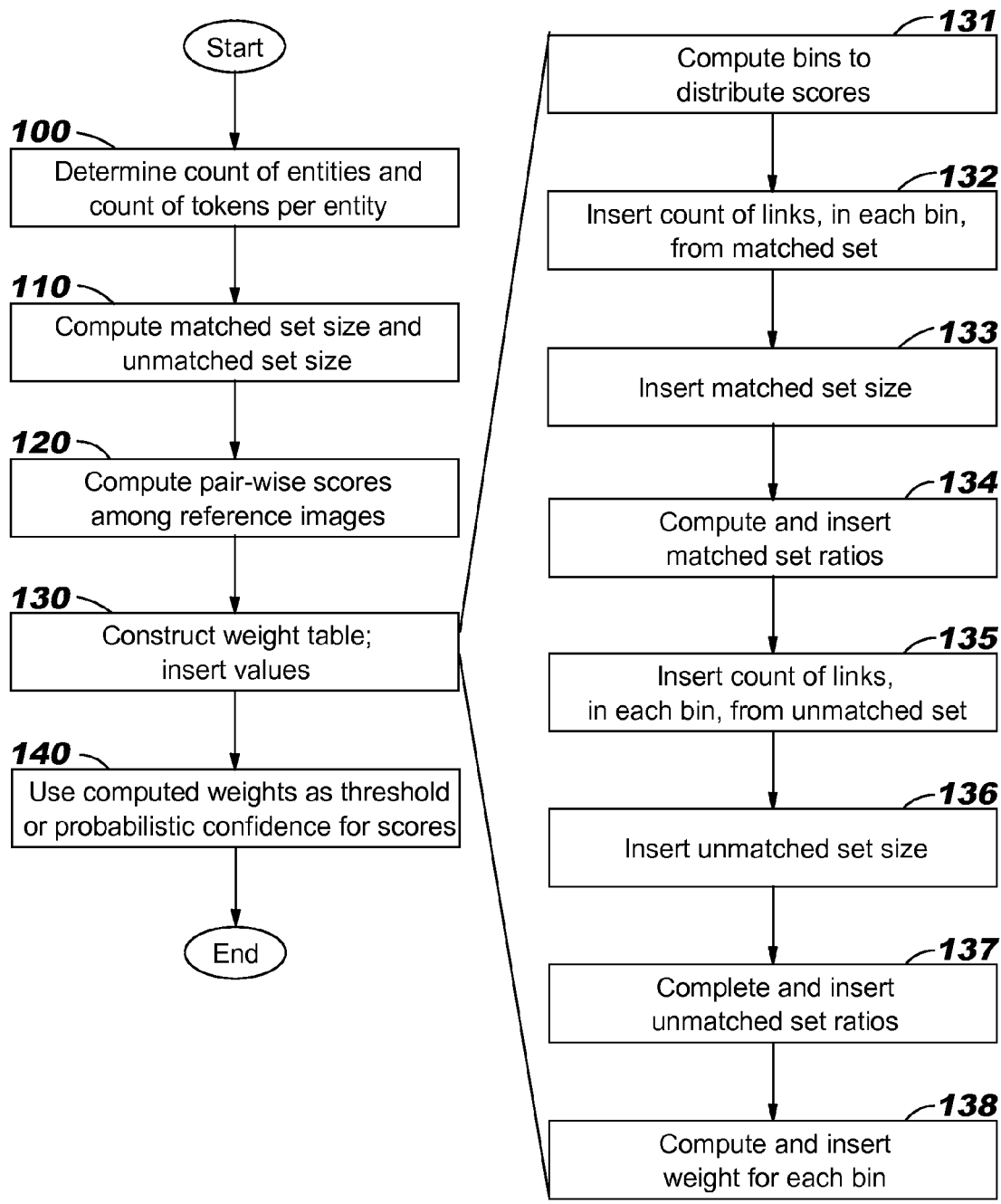
FIG. 1 presents a flowchart depicting logic which may be used when implementing one embodiment of the present invention.

Embodiments of the present invention are directed toward generating weights for biometric tokens in probabilistic matching systems. Use of disclosed techniques according to an embodiment of the present invention may provide improved accuracy when performing matching of biometric tokens in such systems, among other benefits, as will be described.

As noted earlier, a known approach to probabilistic matching uses probabilities when making predictions about matching. The predictions may be generally grouped as non-matching, possibly matching, and matching, along a spectrum of scores computed by a scoring function that analyzes similarity of compared data. Known techniques have not used probabilistic matching for biometric tokens, however. A drawback of using only a similarity score, without considering a weight within the given data set, is to increase false positives (i.e., comparison scores that indicate a match, when the underlying tokens do not actually belong to the same person) and false negatives (i.e., comparison scores that indicate a non-match, when the underlying tokens do in fact actually belong to the same person). Probabilistic matching is considered advantageous because it allows a confidence or threshold variable to be introduced into the matching process. Accordingly, an embodiment of the present invention computes a set of weights for a reference set of biometric tokens, and these weights may then be used with those biometric tokens and/or with other biometric tokens in a probabilistic matching system to assess confidence of a computed similarity score, as will now be discussed.

Several terms used herein will now be defined. The term "token", as used herein, refers to a specific feature used in a matching process. A token might comprise a facial image, a name, a date of birth, a fingerprint, and so forth. A biometric token is a token that uses biometric data. Biometric scanners are well known, and have been used to capture facial images, fingerprints, iris scans, palm scans, and so forth. A set of tokens that belong to a single "entity" is referred to as a "record", and an entity may have multiple records. For example, the entity may be a person, and a person may have a facial image record, a fingerprint image, and so forth. A set of records corresponds to an entity. A "link" is between two records, and represents a comparison of the two records. A "match" is found when two tokens in a link are from the same person. A "non match" is found when two tokens in a link are from two different people. A "weight table" is a summary table that is computed, according to an embodiment of the present invention, to map a score to a confidence value.

An example is used herein to illustrate operation of the present, and by way of illustration but not of limitation, refers to biometric tokens which are facial images. A single person might have any number of facial images, where these images may be created, for example, by taking photos of the person from different angles, taking photos with different resolution, and so forth.

Suppose, for purposes of the example, that a reference set of biometric tokens consists of 9 facial images, where it is known that these 9 facial images correspond to 3 different people, and that 3 of the facial images are of each person— that is, each of 3 people has 3 different facial images in this sample reference set. The people will be referred to herein using numbers, and the facial images will be referred to herein using letters. The set of people is thus denoted as {1, 2, 3} and the set of facial images for each person is denoted as {a, b, c}. A notation of the form "number.letter" is used herein to refer to a particular person and a corresponding image of that person. For example, "1.a" indicates one of the 3 facial images of person 1, while "1.b" indicates a different one of this person's facial images and "2.a" indicates one of the 3 facial images of person 2.

A scoring function or algorithm is used for comparing two biometric tokens to each other, and returns an output value in the range [0, 1], where an output value equal to 0 indicates no match and an output value equal to 1 indicates a match. (While embodiments of the present invention are described with reference to a scoring function that returns output values in this range, this is by way of illustration and not of limitation, and it will be obvious in view of the teachings herein how the disclosed approach may be adapted for use with an alternative range of values.) Non-zero values that are less than 1 indicate a match with a certain likelihood. A known scoring function may be used with an embodiment of the present invention, where this scoring function may be adapted to a particular type of biometric token. An embodiment of the present invention computes weights for use with the output of the scoring function, for use in subsequent comparisons of biometric tokens that are not necessarily present in the reference set.

An embodiment will now be described with reference to the flowchart in FIG. 1 and sample data illustrated in FIGS. 2-6.

The processing of FIG. 1 begins by determining the count of distinct entities, n, and the count of biometric tokens, m, per entity (Block 100) in the reference set. In the example, each of these counts is 3, as discussed earlier.

Next, the maximum matched set size and maximum unmatched set size are computed (Block 110). These values are computed according to the following formulas:

Maximum matched set size=$n*m*(m-1)/2$

Maximum unmatched set size=$m*m*n*(n-1)/2$

Thus, for the example, there will be 9 entries in the matched set and 27 entries in the unmatched set. These are computed as matched set size=$3*3*(3-1)/2=9$ and unmatched set size=$3*3*3*(3-1)/2=27$. Note that in the general case, it is not required that each person has an identical number of tokens in the reference set. For example, person 1 might have 3 facial images, while person 2 might only have 2 images. Thus, the computations discussed herein for the example data correspond to a maximum value scenario in which in person has the maximum number of tokens.

The biometric tokens in the reference set—again, facial images of persons, for the example—are compared using a similarity scoring function, for both the matched set and the unmatched set, to get a score for each comparison (Block 120). The score indicates the similarity of the compared tokens, or stated another way, the likelihood that the tokens are from the same entity. FIG. 2 provides a sample table illustrating results from a similarity scoring function for the matched set of biometric tokens, and FIG. 3 provides a sample table illustrating results from the same similarity scoring function for the unmatched set of these same biometric tokens. (For ease of reference, the similarity scoring function is also referred to herein simply as the "scoring function".)

For the matched set which is represented by table 200 of FIG. 2, pair-wise comparisons using the scoring function are made among the images which are known to belong to each person. Thus, for person 1, image a is compared to image b; image a is compared to image c; and image b is compared to image c. The result of each comparison is a link, and these links for the example matched set are shown in FIG. 2 using a notation of the form "person.image—person.image" for each link. Element 210, for example, shows that the link between the first two images "a" and "b" of person "1", namely the link "1.a-1.b", received a score of 0.9 from the scoring function. Similarly, element 211 shows that the link between 1.a and 1.c received a score of 0.9 and element 212 shows that the link between 1.b and 1.c also received a score of 0.9. It can be seen by these scores that the 3 images for person 1 are apparently similar to one another, because the scoring function matched them with 90 percent certainty in each pair-wise comparison. The images for person 3 also received a score of 0.9 for each link. See elements 230-232. On the other hand, the images for person 2 received scores of 0.4, 0.5, and 0.8. See elements 220-222. This indicates that while images b and c for person 2 are somewhat similar, images a and b are much less similar to one another, and images a and c are only slightly more similar to each other. The similarity scores for person 2 are lower than those for persons 1 and 3, as can be seen from table 200. This indicates that the scoring function is not working as well for the biometric tokens of person 2—whose photos may have been taken with poor lighting, or from distinct orientations, for example. The weights which are computed according to an embodiment of the present invention thus provide for abstracting the scoring function, in view of its ability to detect known matches and known non-matches.

For the unmatched set which is represented by table 300 of FIG. 3, pair-wise comparisons using the scoring function are made among all of the images which are known to not belong to each person. Accordingly, for person 1, image a is compared to all 3 images of person 2, and image a is also compared to all 3 images of person 3. In addition, images b and c for person 1 are each compared to all 3 images of person 2 and to all 3 images of person 3, and so forth, until all 27 comparisons for the unmatched set have been performed. (Note that duplicates will arise if constructing all pairs of non-matching images for evaluation by the scoring function, and these duplicates are therefore not generated as part of the unmatched set. For example, a comparison of 1.a to 2.b will have the same score as a comparison of 2.b to 1.a.) The links for the example unmatched set are shown in FIG. 3. Element 310, for example, shows that the link between 1.a and 2.a (representing a comparison of facial images of 2 different people) received a score of 0.5 from the scoring function, meaning that the scoring function concluded that there is a 50 percent chance that these images are of the same person. (Note that the similarity scores for the unmatched set will typically be lower than those for the matched set.)

The values obtained thus far are used for constructing a data structure referred to herein as a "weight table" (Block 130). While discussions herein refer to using a table, it will be obvious to those of ordinary skill in the art that one or more data structures in another form or forms (such as tuples or linked lists) may be used without deviating from the scope of the present invention. This weight table will map the scoring function into a probabilistic, or confidence-based, threshold for linkage. A first step in constructing the weight table is to determined the number of rows (Block 131). The rows of the weight table are also referred to herein as "scoring bins", or equivalently, "bins". The number of rows to use in a particular weight table depends on the distribution of the results from the scoring function, and the bins are preferably chosen such that the similarity scores will be evenly distributed among the bins. The lower and upper boundary of each bin is chosen to achieve a separation among the similarity scores, within the range of possible scores from the similarity function. For the sample data shown in FIGS. 2 and 3, it can be seen that the scores all belong to the set {0.4, 0.5, 0.8, 0.9}. Thus, for purposes of illustrating the separation among the bins, 4 bins will be used for distributing these scores. Accordingly, the weight table illustrated at 400 of FIG. 4 shows the bins as corresponding to the following score ranges: [0, 0.45), [0.45, 0.7), [0.7, 0.85), and [0.85, 1]. See the entries in "scoring bin" column 401 for rows 410, 420, 430, 440, respectively. (Note that the syntax used herein for describing the ranges uses a right parenthesis to signify that scores equal to the final range value are not included in the corresponding bin; instead, the bin ends with scores less than that final range value.) In the general case, similarity scores may not be evenly distributed. For example, it may happen that similarity scores computed for a reference set are heavily clustered in the range [0.8, 1]. In such cases, the bins may be unevenly separated as well, such as using a single bin for tokens scoring less than 0.8 and many bins for tokens scoring between 0.8 and 1. (FIG. 5, which is discussed below, provides an illustration of this type of distribution and separation for the bins.)

The values entered into in column 402 (Block 132) indicate how many links in the matched set (as illustrated by the entries in table 200 of FIG. 2) fall within each particular scoring bin. Accordingly, element 412 indicates that only 1 link from the matched set had a score less than 0.45, in the example, while element 442 indicates that 6 of the links from the matched set had a score higher than 0.85. The value entered into column 403 (Block 133) is value m, the total matched set size. The values entered into column 404 (Block 134) are computed as the ratio of column 402 to column 403, and thus this column 404 is termed the "matched set ratio". Element 444, for example, indicates that 67 percent of the matched set falls within the bin [0.85, 1].

The values entered into column 405 (Block 135) indicate how many links in the unmatched set (as illustrated by the entries in table 300 of FIG. 3) fall within each particular scoring bin. Accordingly, element 445 indicates that only 1 link from the unmatched set had a score higher than 0.85, in the example, while element 425 indicates that 18 of the links from the unmatched set had a score of at least 0.45 and less then 0.7. The value entered into column 406 (Block 136) is value n, the total unmatched set size. The values entered into column 407 (Block 137) are computed as the ratio of column 405 to column 406, and thus this column 407 is termed the "unmatched set ratio". Element 447, for example, indicates that only 4 percent of the unmatched set falls within the bin [0.85, 1].

Next, a weight value is computed for each bin (Block 138). An embodiment of the present invention computes the bin weight, for each bin i, according to the following formula (where, as will be obvious, "log" denotes a logarithm):

$$weight_i = \log(\text{matched set ratio}_i / \text{unmatched set ratio}_i)$$

Accordingly, element 418 shows a weight value of −0.37, which is computed as the log (0.11/0.26), for the bin that corresponds to row 410 of the example. Similarly, element 438 shows a weight value of 0.44, which is computed as the log (0.11/0.04), for the bin that corresponds to row 430 of the example.

Weights thus computed from the reference set data are used in subsequent probabilistic matching for facial images (or more generally, biometric tokens) that do not necessarily match any of the reference set data (Block 140), for making an improved comparison decision. (It may happen that one or both of the images being compared subsequently are also present in the reference set data, although this is not required.) The weights are interpreted as a threshold or probabilistic confidence that if the scoring function returns a value falling within the range for a specific bin for 2 records that are being compared, then with this weight/confidence, these 2 records are a match and therefore belong to the same entity. One of the records may correspond to a known entity, for example, and it may be desired to test whether the other records belongs to that same entity. When using the computed weights as probabilistic confidence values, for example, a query may be issued with semantics of "return all links with weight >1". The weights may be used when evaluating multiple tokens—including tokens from different biometric types, as well as tokens that are of other forms such as biographic or demographic data—to compute a total weight for entity linking, in which case the weights from the multiple evaluated tokens are preferably summed to compute the total weight. Optionally, different percentages may be applied to the multiple tokens, such as applying 20% to name, 40% to facial image, and 40% to fingerprint (noting that the percentages sum to 100). Using these example percentages, evaluating an equation of the form (0.2*nameWeight+0.4*faceWeight+0.4*fingerprintWeight) yields the total weight, or confidence, of the entity links. From the above-discussed example where 2 facial images are compared and the link between these 2 image is scored as 0.875 by the scoring function and the computed weight is 1.22, multiplying this faceWeight value 1.22 by the associated percentage 0.4 yields 0.488. (This faceWeight value 1.22 is taken from column 408 of row 440, responsive to determining that the computed score of 0.875 falls into bin 441.)

As will be obvious, the values in table 400 are computed from a very small reference set, which was chosen to facilitate illustration of the computations performed by an embodiment of the present invention. In general, a reference set used in a probabilistic matching system will typically represent 1,000 or more entities (although an embodiment of the present invention does not require a particular size for the reference set). FIG. 5 provides a table 500 which has been constructed from an actual reference set of facial images for persons, where the data in table 500 corresponds to a larger set (as compared to table 400) of biometric tokens as reference set data. Thus, table 500 may be considered as providing more realistic values, which represent a more thorough comparison of biometric tokens and a more thorough exercise of the scoring function. For example, it can be seen from column 503 that the size of the matched set used for table 500 is 20,639, and it can be seen from column 506 that the size of the unmatched set is 11,554,627, when using the larger set of reference data. Furthermore, it can be seen that the scoring function computed scores that fall into 8 bins (i.e., the 8 rows of table 500) when using this larger set of reference data.

Figure 6:
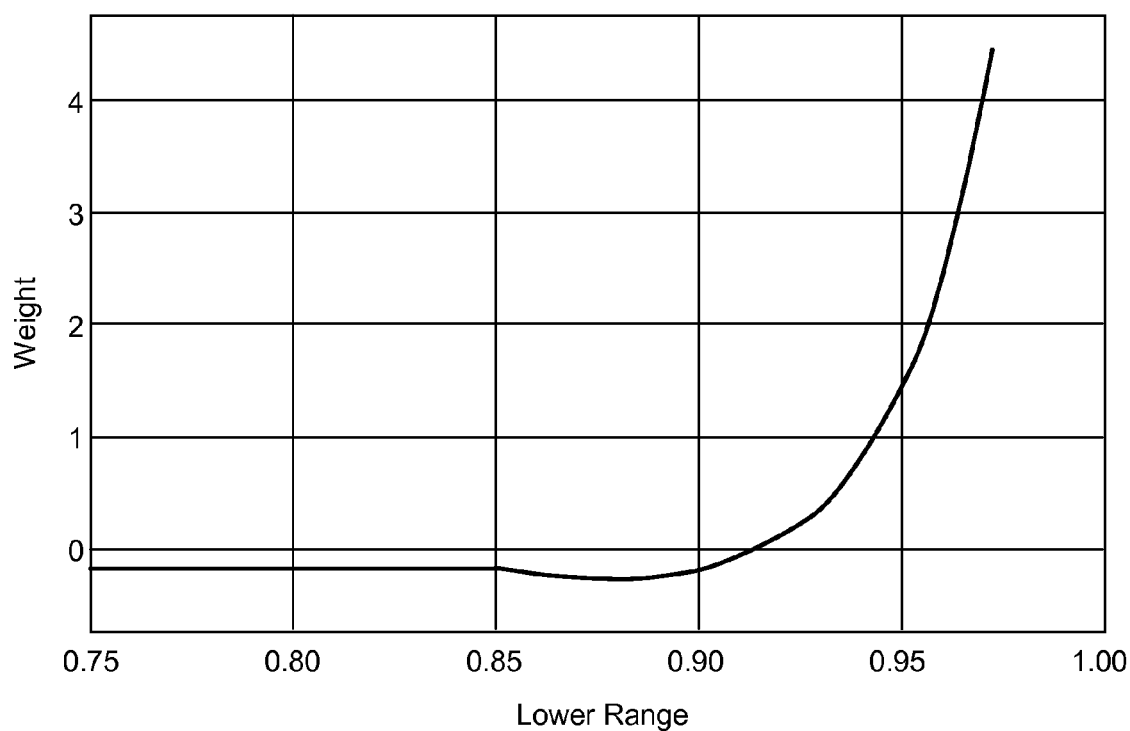
FIG. 6 presents a graph that illustrates an example distribution of weights computed using techniques disclosed herein.

FIG. 6 presents a graph 600 that illustrates an example distribution of weights computed using techniques disclosed herein. This graph 600 corresponds to the data used for constructing table 500 of FIG. 5. (Note that creating such graph is not a required aspect of the present invention, and graph 600 is provided primarily for illustrative purposes and for visually viewing the weight distributions.) The x-axis corresponds to the scoring bins, and the y-axis corresponds to the weights computed for the bins. Thus, the graph indicates a distribution of how well the scoring function matched up to the computed weight values. In this example, the x-axis begins at 0.75, which represents scores where the scoring function indicates a low likelihood of a match, and extends through 1, where the scoring function indicates that there is good agreement between the compared tokens. The weights for bins in the range 0.75 through (but not including) 0.925 (corresponding to the first 4 rows 510-540 of table 500) are small negative numbers generally near or less than −0.2, as can be seen from table 500. Graph 600 shows a generally horizontal line from x=0.75 through x=0.85, which then dips down before accelerating upward. For this example, the weight for the bin that includes 0.925 (see row 550 of table 500) is near zero, and thus the graph crosses the y-axis near x=0.925. The weight for the bin that includes 0.9625 (see row 570 of table 500) is near 2, and the maximum point on the graph 600 is reached with the weight for the bin that begins at 0.975 (see row 580 of table 500), where this weight is approximately 4.4.

Referring again to table 500 of FIG. 5, the small negative weights for the lower bins (see rows 510-540) mean that this scoring function is not able to determine, with any certainty, that 2 compared photos are not from the same person. (Generally, weights in the −2 range would be needed to make that conclusion.) This is consistent with expectations for the reference set used in constructing table 500, since two facial images for a particular person may be (and are, in the actual reference set) quite different. Similar results may be expected for reference sets using other types of biometric tokens.

The manner in which weights computed according to an embodiment of the present invention may be used may vary from one application to another. As has been noted above, it may be desirable in a particular application to use one biometric token for which the corresponding entity is known, and to test whether a second biometric token also corresponds to that entity with a particular degree of confidence; or, in another application, it may be desirable to compare 2 tokens for which the entity is not known, in order to reach a conclusion about whether the tokens belong to the same entity.

As has been demonstrated, an embodiment of the present invention determines weights for use in probabilistic matching systems that analyze biometric tokens. Techniques disclosed herein are directed toward making the decision of match versus non-match more data-driven and more accurate.

Referring now to FIG. 7, a block diagram of a data processing system is depicted in accordance with the present invention. Data processing system 700 may comprise a processor 702 connected to system bus 704. Also connected to system bus 704 is memory controller/cache 706, which provides an interface to local memory 708. An I/O bridge 710 is connected to the system bus 704 and provides an interface to an I/O bus 712. The I/O bus may be utilized to support one or more buses 714 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 716, storage 718, and a computer usable storage medium 720 having computer usable program code embodied thereon. The computer usable program code may be executed to execute any aspect of the present invention, as have been described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A system for generating weights for biometric tokens in probabilistic matching systems, comprising:
    a reference data set stored in persistent storage of a computing system, the reference data set comprising a plurality of biometric tokens for each of a plurality of distinct entities, the reference data set further comprising a matched set of the tokens and an unmatched set of the tokens;
    a computer comprising a processor; and
    instructions which are executable, using the processor, to perform functions comprising:
        analyzing the biometric tokens of the reference data set by performing a pair-wise comparison of the tokens in the matched set and of the tokens in the unmatched set using a similarity scoring function;
        determining a plurality of scoring bins, based on similarity scores computed by the analyzing, wherein an upper and a lower boundary of each of the scoring bins is selected for separating the similarity scores;
        computing, for each of the scoring bins, a weight for the scoring bin, the weight for each bin computed in view of how many of the similarity scores from the matched set fall into the bin and how many of the similarity scores from the unmatched set fall into the bin; and
        using the weights for assessing subsequently-computed similarity scores from the similarity scoring function.

2. The system according to claim 1, wherein:
    the matched set of the tokens comprises, for each of the distinct entities, a pair comprising a link between the distinct entity and each of the tokens which is known to correspond to the distinct entity; and
    the unmatched set of the tokens comprises each unique pair comprising a link between one of the distinct entities and each of the tokens which is known to not correspond to the distinct entity.

3. The system according to claim 1, wherein computing the weight for each of the scoring bins comprises a logarithm of (a ratio of the matched set for the bin divided by a ratio of the unmatched set for the bin), wherein the ratio of the matched set for the bin is computed as (a count of how many of the similarity scores from the matched set fall into the bin divided by a maximum size of the matched set) and the ratio of the unmatched set for the bin is computed as (a count of how many of the similarity scores from the unmatched set fall into the bin divided by a maximum size of the unmatched set).

4. The system according to claim 3, wherein the maximum size of the matched set is computed as $(n*m*(m-1)/2)$ and the maximum size of the unmatched set is computed as $(m*m*n*(n-1)/2)$, wherein n is a count of distinct entities represented by the reference data set and m is a count of a maximum number of biometric tokens present in the reference data set for each of the distinct entities.

5. The system according to claim 1, wherein the biometric tokens comprise iris scans of persons.

6. The system according to claim 1, wherein the biometric tokens comprise palm scans of persons.

7. A computer program product for generating weights for biometric tokens in probabilistic matching systems, the computer program product comprising:
- a non-transitory computer-readable storage medium having computer readable program code embodied therein, the computer-readable program code configured for:
- analyzing biometric tokens of a reference data set, the reference data set comprising a plurality of biometric tokens for each of a plurality of distinct entities, the reference set further comprising a matched set of the tokens and an unmatched set of the tokens, by performing a pair-wise comparison of the tokens in the matched set and of the tokens in the unmatched set using a similarity scoring function;
- determining a plurality of scoring bins, based on similarity scores computed by the analyzing, wherein an upper and a lower boundary of each of the scoring bins is selected for separating the similarity scores;
- computing, for each of the scoring bins, a weight for the scoring bin, the weight for each bin computed in view of how many of the similarity scores from the matched set fall into the bin and how many of the similarity scores from the unmatched set fall into the bin; and
- using the weights for assessing subsequently-computed similarity scores from the similarity scoring function.

8. The computer program product according to claim 7, wherein:
- the matched set of the tokens comprises, for each of the distinct entities, a pair comprising a link between the distinct entity and each of the tokens which is known to correspond to the distinct entity; and
- the unmatched set of the tokens comprises each unique pair comprising a link between one of the distinct entities and each of the tokens which is known to not correspond to the distinct entity.

9. The computer program product according to claim 7, wherein computing the weight for each of the scoring bins comprises a logarithm of (a ratio of the matched set for the bin divided by a ratio of the unmatched set for the bin), wherein the ratio of the matched set for the bin is computed as (a count of how many of the similarity scores from the matched set fall into the bin divided by a maximum size of the matched set) and the ratio of the unmatched set for the bin is computed as (a count of how many of the similarity scores from the unmatched set fall into the bin divided by a maximum size of the unmatched set).

10. The computer program product according to claim 9, wherein the maximum size of the matched set is computed as $(n*m*(m-1)/2)$ and the maximum size of the unmatched set is computed as $(m*m*n*(n-1)/2)$, wherein n is a count of distinct entities represented by the reference data set and m is a count of a maximum number of biometric tokens present in the reference data set for each of the distinct entities.

11. The computer program product according to claim 7, wherein the biometric tokens comprise facial images of persons.

12. The computer program product according to claim 7, wherein the biometric tokens comprise fingerprints of persons.

* * * * *